Patented Apr. 25, 1933

1,905,915

UNITED STATES PATENT OFFICE

RALPH E. LAWRENCE, OF WICKLIFFE, OHIO, ASSIGNOR TO THE GRASSELLI CHEMICAL COMPANY, OF CLEVELAND, OHIO, A CORPORATION OF DELAWARE

CONDENSATION PRODUCT OF CINCHONA BARK ALKALOIDS WITH THIURAM SULPHIDES AS INHIBITORS

No Drawing.   Application filed December 19, 1931. Serial No. 582,186.

The present invention relates to novel organic compounds and their use for controlling the action of acids upon metals, and to processes of cleaning, pickling, scaling or removing oxides, scale and any other undesirable incrustations from metal articles, and the invention comprises the condensation products obtained by heating together a cinchona bark alkaloid with a thiuram sulphide and the use of such products as inhibitors.

Thiuram sulphides are chemical compounds of the general formula $$R_2N-CS-(S)_x-CS-NR_2$$

in which R stands for hydrogen or a hydrocarbon radical and $x$ for the numerals, 1, 2, 3, etc.

I found that when thiuram sulphides and cinchona bark alkaloids are mixed and the mixture heated to temperatures above about 100° C. a chemical reaction takes place with evolution of heat. I have been unable to isolate from the reaction mixtures any definite chemical compound. Even when using other than stoichiometric proportions, I did not succeed in separating any of the two original products from the reaction product. When using quinoidine, which is itself a complex, amorphous mixture of various unknown products, as the cinchona bark alkaloid, no such stoichiometric proportion could be calculated.

As far as physical and inhibiting properties are concerned, there is no substantial difference in the product obtained by using varying amounts of the two ingredients. I have produced condensation products from mixtures containing from 10 to 50% by weight of the thiuram sulphide compound, although in my preferred process I use about 25%.

Among the various components from which I can produce my novel inhibitors, I prefer both from a standpoint of efficiency as well as due to the availability of the materials to use quinoidine and the tetramethyl-thiuram mono and disulphides, though the individual medicinal cinchona bark alkaloids, such as quinine, cinchonine, quinidine and other thiuram sulphides when melted together at elevated temperature produce valuable inhibitors. I can also substitute for the thiuram sulphides the dithiocarbamates from which the thiuram sulphides are produced by oxidation and obtain substantially the same condensation products. I may assume that under the conditions of the reaction the thiuram sulphides are formed at an intermediate stage and then react with the alkaloid.

The preferred process for preparing quinoidine condensation products is as follows: The quinoidine is first melted in any suitable receptacle until it is in a fluid state. A definite amount of thiuram sulphide of the general formula, $$R_2N-CS-(S)_x-CS-NR_2$$

is then added and stirred into the molten quinoidine. Heating of the mass is continued until a temperature of about 130° C. is reached. This temperature is held for about 15-20 minutes, after which the product is allowed to cool.

The condensation products of cinchona bark alkaloids with thiuram sulphides are amorphous, resinous products of yellowish to brown color. They have no definite melting point. They are substantially insoluble in aqueous caustic alkali.

The condensation products prepared from quinine and quinidine are soluble in the common organic solvents. Those prepared from quinoidine and tetramethyl-thiuram mono and disulphide are only little soluble in common organic solvents except acetone and chloroform in which they are easily soluble.

These novel condensation products are almost completely soluble in dilute mineral acids.

The usual pickling and cleaning baths for metallic articles consist of dilute, non-oxidizing mineral acids, such as sulphuric, hydrochloric, and acetic acids. The articles are treated therewith at various temperatures and under conditions best suited to the particular problem, it being understood that pickling of sheet steel, steel stock for wire, etc., for instance, may require different operations, concentrations of acid, temperature, etc., than descaling boiler tubes or freeing water pipes from rust and other undesirable incrustations.

The addition of a small amount of a cinchona bark alkaloid-thiuram sulphide condensation product to the acids used in such operations will prevent or greatly reduce the attack of the acid on the metal itself, without materially affecting the dissolution of the scale, rust and other incrustations. This results in a noticeable saving of acid, but the main advantage of the use of my novel inhibitors is the protection of the metal articles which are not weakened or pitted by continued action of the acid after removal of the scale, rust, and other incrustations.

Amounts less than ½ of 1% of my novel condensation product are usually sufficient to produce the desired inhibiting effect. Among the various thiuram sulphides used in the preparation of my quinoidine condensation product, I found that some of the best for the preparation of my condensation product are the tetraalkyl-thiuram disulphides and the tetraalkyl-thiuram mono-sulphides.

In pickling operations the concentration of acid in the pickling bath varies from 5 to 10%, and the temperature from 140 to 190° F. Laboratory tests by the so-called loss in weight method, which consists of a beaker-scale pickling operation using a 6% sulphuric acid pickling bath at 180° F., noting the loss in weight of the steel after one-half hour and after two one-hour periods of immersion after the first half hour immersion in the bath, showed my novel inhibitors to have the following inhibiting efficiencies when the quinoidine condensation products are compounded at the rate of 10% with 90% inert ingredients.

| Concentration of compounded inhibitor | .05 per cent | | | .1 per cent | | |
|---|---|---|---|---|---|---|
| Period of pickling | 1 | 2 | 3 | 1 | 2 | 3 |
| Time of pickling (minutes) | 30 | 60 | 60 | 30 | 60 | 60 |
| Scale included | Yes | No | No | Yes | No | No |
| Inhibitor | | | | | | |
| Condensation product of quinoidine 75% Tetramethylthiuram disulphide 25% | Per cent 75.9 | Per cent 53.7 | | Per cent 69.3 | Per cent 95.0 | Per cent 93.0 |
| Condensation product of quinoidine 75% Tetramethylthiuram mono-sulphide 25% | 79.5 | 60.4 | | 80.9 | 97.0 | 96.0 |
| Quinoidine only | 82.9 | 34.6 | | 88.9 | 44.6 | |
| Tetramethylthiuram disulphide only | 1.9 | 40.7 | | 28.4 | 33.6 | |
| Tetramethylthiuram mono-sulphide only | 10.3 | 57.5 | | 30.0 | 49.6 | |

In the above table the efficiency for the first period includes the loss in weight due to adhering scale and other incrustations which vary on the different specimens of steel. In the second and third periods the loss is due to loss of bare metal only.

Similar results are obtained with condensation products from other cinchona bark alkaloids and other thiuram sulphides.

I am aware that both types of materials from which my novel condensation products are produced have been patented as inhibitors. See United States Patents 1,742,986, Jan. 7, 1930, H. P. Corson; and 1,809,621, June 9, 1931, H. P. Corson.

The results described above clearly show the superior efficiency of the condensation products over the individual compounds from which these products are obtained. In addition, the condensation products are much easier soluble in the dilute pickling acids than the thiuram sulphides.

I claim:

1. A cleaning and pickling bath for metals comprising a dilute non-oxidizing acid containing a small amount of a condensation product of a cinchona bark alkaloid and a thiuram sulphide.

2. A cleaning and pickling bath for metals comprising a dilute non-oxidizing acid containing a small amount of a condensation product of a quinoidine and tetramethyl-thiuram sulphide.

3. In a process for pickling and cleaning metal articles, the step comprising treating said articles with a dilute, non-oxidizing acid containing a small amount of a condensation product of a cinchona bark alkaloid and a thiuram sulphide.

4. In a process for pickling and cleaning metal articles, the step comprising treating said articles with a dilute, non-oxidizing acid containing a small amount of a condensation product of quinoidine and tetramethyl-thiuram sulphide.

In testimony whereof, I affix my signature.

RALPH E. LAWRENCE.